United States Patent
Haupt et al.

(10) Patent No.: US 10,525,790 B2
(45) Date of Patent: Jan. 7, 2020

(54) MULTI-PLANAR AIR DIVERTER

(71) Applicant: Hanon Systems, Daejeon (KR)

(72) Inventors: Eric Haupt, Livonia, MI (US); Dennis Vermette, Westland, MI (US); Jim Nolta, Canton, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/293,861

(22) Filed: Oct. 14, 2016

(65) Prior Publication Data

US 2018/0105015 A1  Apr. 19, 2018

(51) Int. Cl.
B60H 1/00 (2006.01)

(52) U.S. Cl.
CPC ..... B60H 1/00564 (2013.01); B60H 1/00028 (2013.01); B60H 1/00678 (2013.01); B60H 1/00835 (2013.01); B60H 2001/00092 (2013.01); B60H 2001/00714 (2013.01)

(58) Field of Classification Search
CPC ............ B60H 1/00564; B60H 1/00028; B60H 1/00021; B60H 2001/00092; B60H 2001/00099; B60H 1/00835; B60H 1/00842; B60H 1/00871; Y10T 137/87812
USPC ........................................................ 137/875
See application file for complete search history.

(56) References Cited

U.S. PATENT DOCUMENTS

| | | | | |
|---|---|---|---|---|
| 5,779,535 A | * | 7/1998 | Bendell | B60H 1/00842 137/637.3 |
| 8,926,413 B2 | * | 1/2015 | Hurd | B60H 1/00064 454/127 |
| 2004/0093884 A1 | * | 5/2004 | Seki | B60H 1/00685 62/244 |
| 2005/0205247 A1 | * | 9/2005 | Ezaki | B60H 1/00028 165/204 |
| 2010/0263828 A1 | * | 10/2010 | Chikagawa | B60H 1/00028 165/59 |

FOREIGN PATENT DOCUMENTS

| | | |
|---|---|---|
| JP | 2016159851 A | 9/2016 |
| KR | 20120080819 A | 7/2012 |
| KR | 20140112684 A | 9/2014 |

* cited by examiner

Primary Examiner — Michael R Reid
(74) Attorney, Agent, or Firm — Shumaker, Loop & Kendrick, LLP; James D. Miller

(57) ABSTRACT

A climate control system for a vehicle comprises a housing and a diverter. The housing has a first conduit formed therein. The first conduit includes a first subconduit formed in an intermediate portion of the first conduit and a second subconduit disposed adjacent an end of the first subconduit. The diverter is rotatably disposed within the first conduit, and includes a first member having an outer edge and an offset edge. The outer edge is disposed on a first planar portion of the first member and configured to sealingly contact a wall of the first subconduit when the diverter is in a first position. The offset edge is disposed on a second planar portion of the first member and configured to sealingly contact a portion of the second subconduit when the diverter is in the first position.

8 Claims, 13 Drawing Sheets

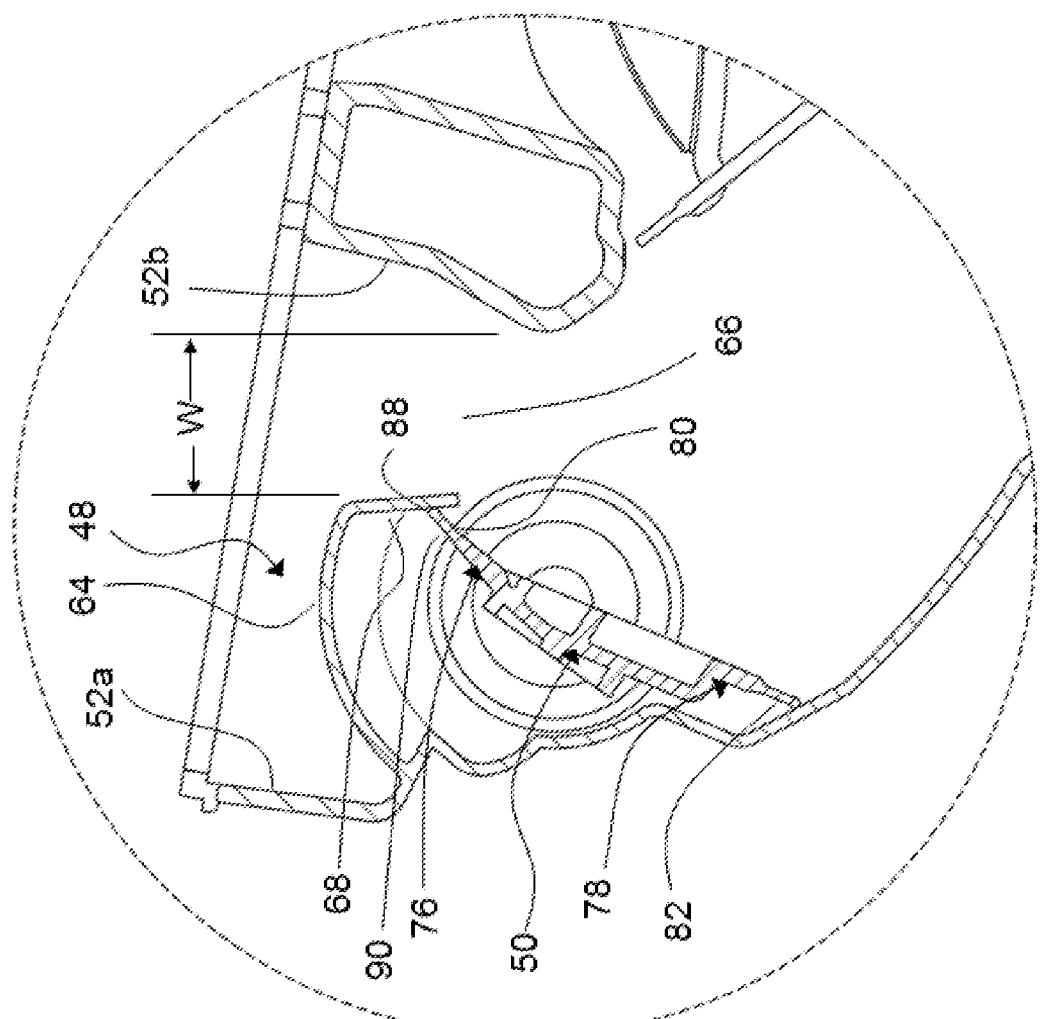

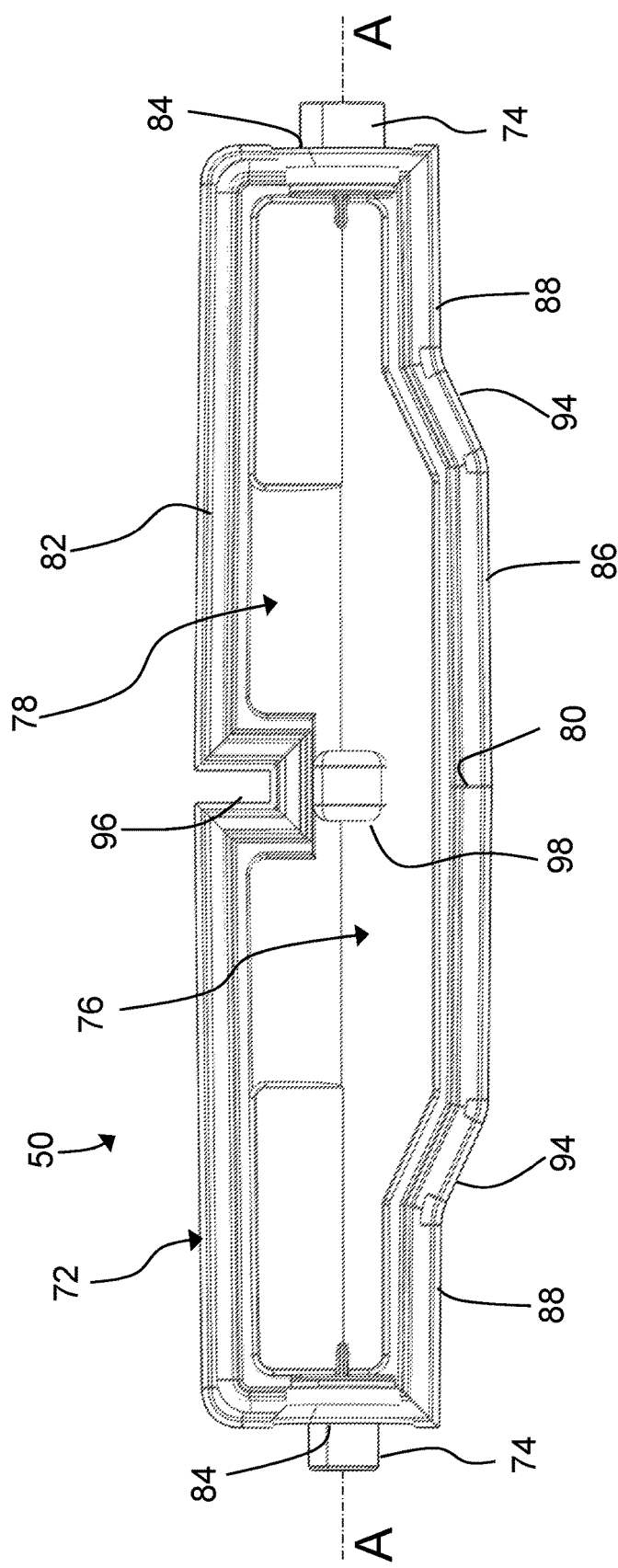
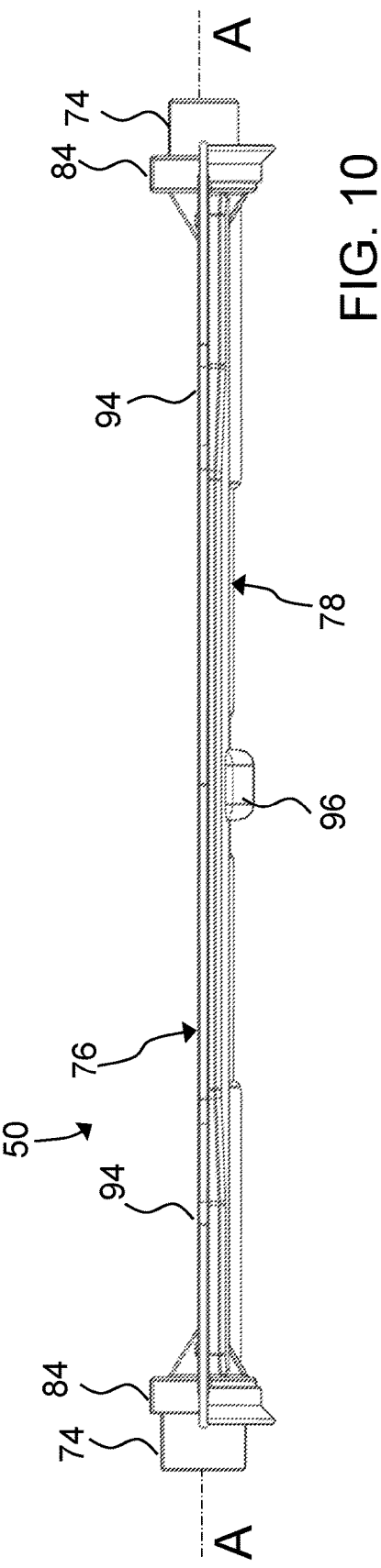
FIG. 9
FIG. 10

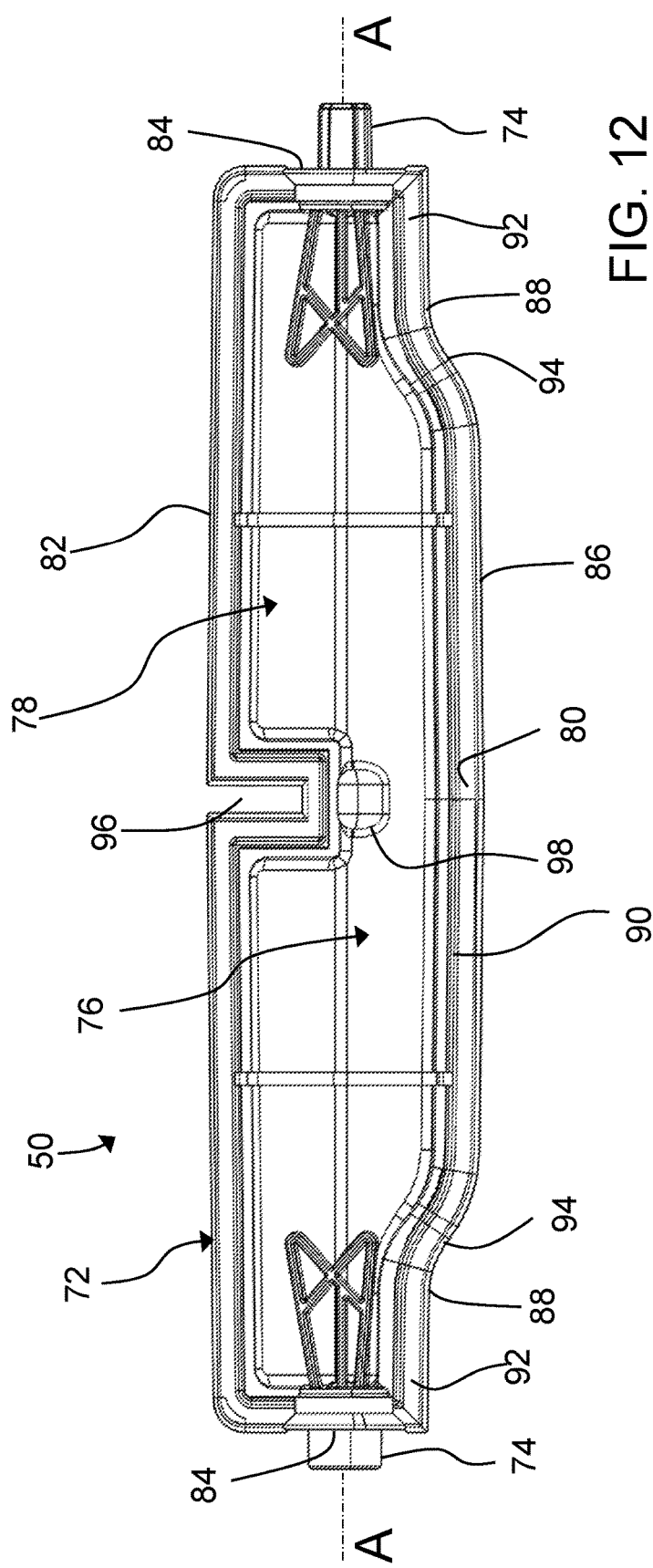
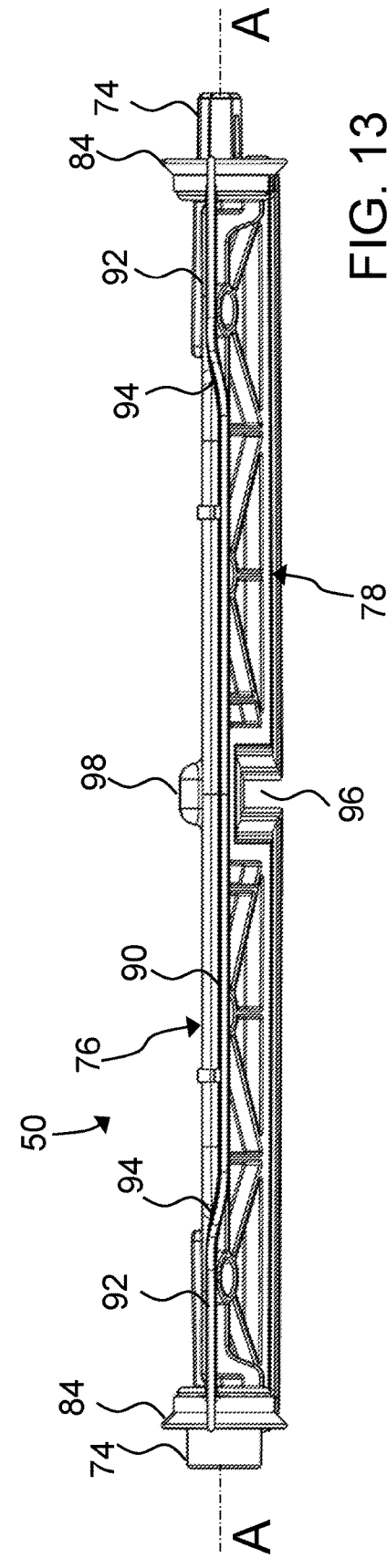
FIG. 12
FIG. 13

MULTI-PLANAR AIR DIVERTER

TECHNICAL FIELD

The disclosure relates to a climate control system for a vehicle, and more particularly to an air diverter for a climate control system of a vehicle.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a plurality of conduits and doors for selectively controlling a flow of air to various vents within the passenger compartment of the vehicle, depending on an operating mode selected by a vehicle occupant. Each operating mode includes a preselected percentage of the air originating from a mixing chamber delivered to each of the corresponding vents associated with the selected operating mode. The vents may include panel vents, console vents, front floor vents, rear floor vents, windshield defrost vents, and side window defrost vents, for example.

Doors disposed within the housing may be actuated to control the distribution of the air to each of the desired vents by blocking or opening various conduits disposed within the delivery section. For example, a "panel operating mode" may include the air distributed only to the panel vents and the console vents, a "defrost operating mode" may include the air distributed only to the windshield defrost vents and the side window defrost vents, and a "floor operating mode" may include the air distributed to each of the front floor vents, the rear floor vents, the windshield defrost vents, and the side window defrost vents.

One problem associated with the distribution of the air to each of the vents of the housing relates to differences in a desired volumetric flow rate through each of the vents in the respective operating modes. Because each of the vents receives air from a common mixing chamber of the housing, each conduit coupling the mixing chamber to a corresponding vent must be configured to create a desired pressure drop in the air to provide the desired flow rate through of each of the vents.

One method of controlling the pressure drop is to variably restrict one or more of the conduits based on the selected operating mode. The variable restriction of the conduit may be achieved by actuating one or more doors disposed within the housing to control the pressure and flow rate of the air through each of the conduits.

One problem associated with variably restricting the flow of the air through each independent conduit is especially evident when attempting to control the pressure of the air through a conduit having multiple distinct passageways. For example, it is common for a passageway leading to the windshield defrost vents and a passageway leading to the side window defrost vents to branch from a common defrost conduit due to these vents often being used simultaneously. Air flowing from the mixing chamber flows into the defrost conduit before branching to one or both of the windshield defrost vents and the side window defrost vents.

Based on the desired flow rates for each of the respective vents, in certain operating modes a pressure required in the passageway leading to the windshield defrost vents may differ in comparison to a pressure required at each of the side window defrost vents. For example, when operating in the floor operating mode, the windshield defrost vents may require a duct pressure of about 5 PA to deliver the air out of the windshield defrost vents at a volumetric flow rate of about 30-40 m$^3$/h whereas the side window defrost vents may require a duct pressure of about 175 PA to deliver the air out of the side window defrost vents at the same volumetric flow rate of about 30-40 m$^3$/h. In contrast, when operating in the defrost operating mode, the windshield defrost vents and the side window defrost vents may each require approximately the same duct pressure of about 225 PA to deliver the air out of the windshield defrost vents and the side window defrost vents at their required volumetric flow rates of about 250-325 m$^3$/h and 35-45 m$^3$/h, respectively. Accordingly, the variation in pressure required in each of the respective passageways frustrates an attempt to simultaneously control the pressure within each passageway by actuating the door disposed upstream of the defrost chamber, as an attempt to control the pressure in one of the flow paths will also affect the ability to control the pressure in the other of the flow paths.

This problem is further evident in view of changing performance specifications for the distribution of the air to the various vents of the passenger compartment based on the corresponding operating mode, and especially changing specifications related to the relative percentage of the air delivered to the side window defrost vents during the floor operating mode, the defrost operating mode, and a mixed floor/defrost operating mode.

For example, in traditional air handling systems the floor operating mode may be configured to provide about 75% of the air to the floor vents, about 17% of the air to the windshield defrost vents, and about 8% of the air to the side window defrost vents. The traditional mixed floor/defrost operating mode may be configured to provide about 56% of the air to the floor vents, about 34% of the air to the windshield defrost vents, and about 10% of the air delivered to the side window defrost vents. The traditional defrost operating mode may provide none of the air to the floor vents, about 80% of the air to the windshield defrost vents, and about 20% of the air to the side window defrost vents. Thus, the relative percentage of the air provided to the side window defrost vents ranges from 8% to 20%, of the total flow of air, depending on the operating mode.

In contrast, performance specifications for newer air distribution systems require the volumetric flow rate of the air provided to the side window defrost vents to be increased and remain relatively constant across the floor operating mode, the mixed floor/defrost operating mode, and the defrost operating mode.

For example, the new specifications for air distribution during the floor operating mode may require about 72% of the air delivered to the floor vents, about 10% of the air delivered to the windshield defrost vents, and about 18% of the air delivered to the side window defrost vents. The new specifications for the mixed floor/defrost operating mode may require about 56% of the air delivered to the floor vents, about 30% of the air delivered to the windshield defrost vents, and about 14% of the air delivered to the side window defrost vents. The new specifications for the defrost operating mode may include none of the air delivered to the floor vents, about 80% of the air delivered to the windshield defrost vents, and about 20% of the air delivered to the side window defrost vents. Thus, the relative percentage of the air provided to the side widow defrost vents ranges from 14% to 20% of the total flow of the air, depending on the operating mode.

Accordingly, in contrast to the traditional requirements wherein the percentage and/or volume of the air distributed to the side window defrost vents more than doubled from the floor operating mode to the defrost mode, the new specifications require the percentage and/or volume of the air distributed to the side window defrost vents to remain relatively constant throughout all three of the operating modes including a side window defrost function. This relationship presents a situation wherein the pressure at the outlets of the side window defrost vents must remain substantially constant for all three operating modes whereas the pressure at the outlets of the windshield defrost vents must vary significantly depending on the selected operating mode.

One solution to the differing pressure requirements between the windshield defrost vents and the side window defrost vents is to provide a separate door for controlling entry into each flow path branching from the defrost chamber. However, this solution may require the addition of multiple components such as doors, actuators, links, or control elements, thereby increasing a cost and complexity to manufacture the air handling system.

Accordingly, there exists a need in the art for a means of providing a first variable flow of air to a first passageway of a conduit and a second variable flow of air to a second passageway of the conduit using a single flow-control mechanism, wherein the first variable flow of air remains relatively constant compared to the second variable flow of air.

SUMMARY OF THE INVENTION

Concordant and consistent with the present invention, a means of providing a first variable flow of air to a first passageway of a conduit and providing a second variable flow of air to a second passageway of the conduit using a single flow-control mechanism, wherein the first variable flow of air remains relatively constant compared to the second variable flow of air has surprisingly been discovered.

A climate control system for a vehicle comprises a housing and a diverter. The housing has a first conduit formed therein. The first conduit includes a first subconduit formed in an intermediate portion of the first conduit and a second subconduit disposed adjacent an end of the first subconduit. The diverter is rotatably disposed within the first conduit, and includes a first member having an outer edge and an offset edge. The outer edge is disposed on a first planar portion of the first member and configured to sealingly contact a wall of the first subconduit when the diverter is in a first position. The offset edge is disposed on a second planar portion of the first member and configured to sealingly contact a portion of the second subconduit when the diverter is in the first position.

BRIEF DESCRIPTION OF THE DRAWINGS

The above, as well as other advantages of the present disclosure, will become readily apparent to those skilled in the art from the following detailed description, particularly when considered in the light of the drawings described hereinafter.

FIG. 5A is an enlarged fragmentary cross-sectional right-side elevational view of one embodiment of the air handling system of FIG. 1B, taken at area 5 of FIG. 4;

FIG. 9 is a top plan view of the diverter of FIG. 8; and

FIG. 10 is a front elevational view of the diverter of FIG. 8.

FIG. 12 is a top plan view of the diverter of FIG. 11; and

FIG. 13 is a front elevational view of the diverter of FIG. 11.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1A:
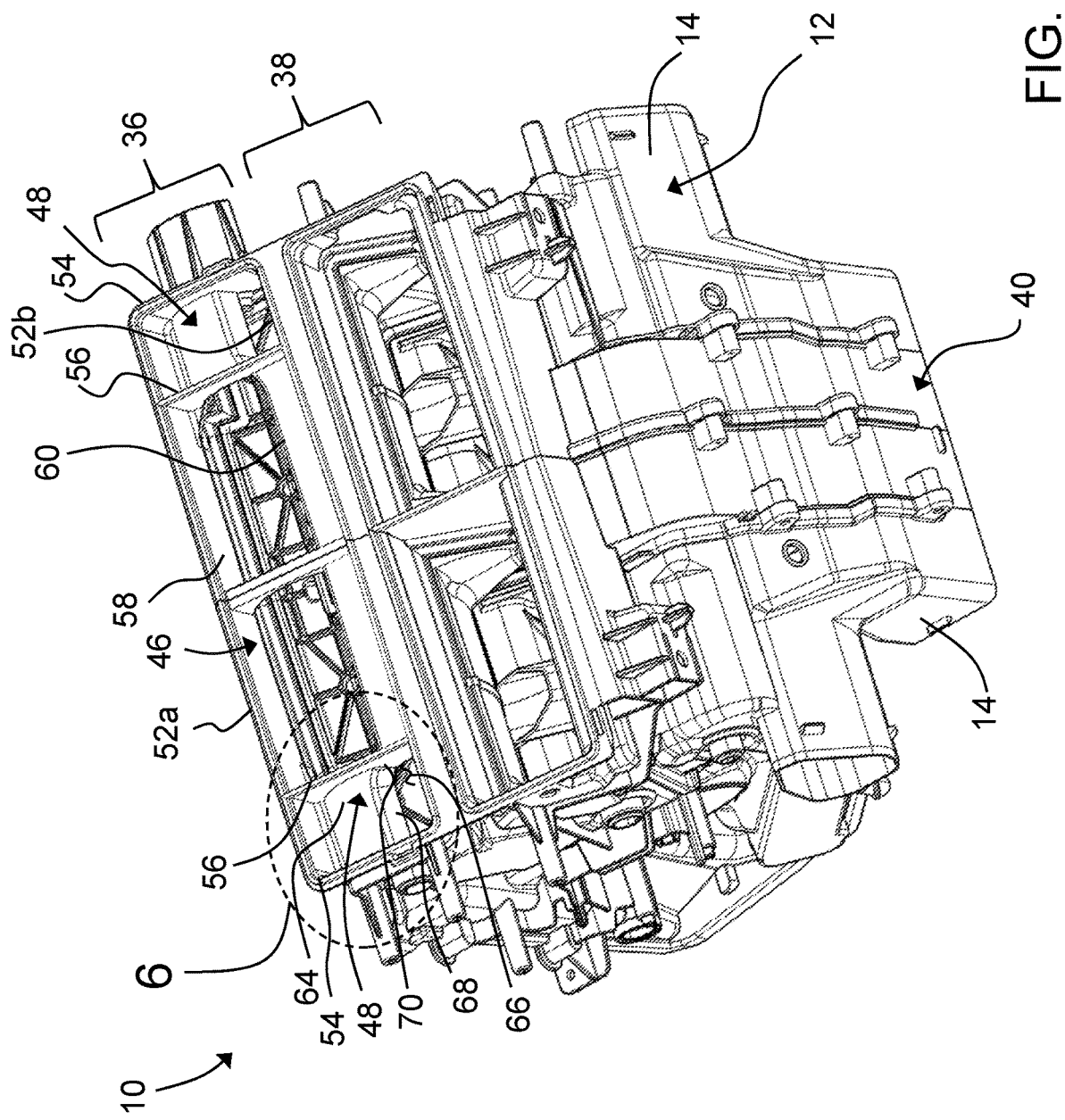
FIG. 1A is a top perspective view of an air handling system according to an embodiment of the disclosure.
Figure 1B:
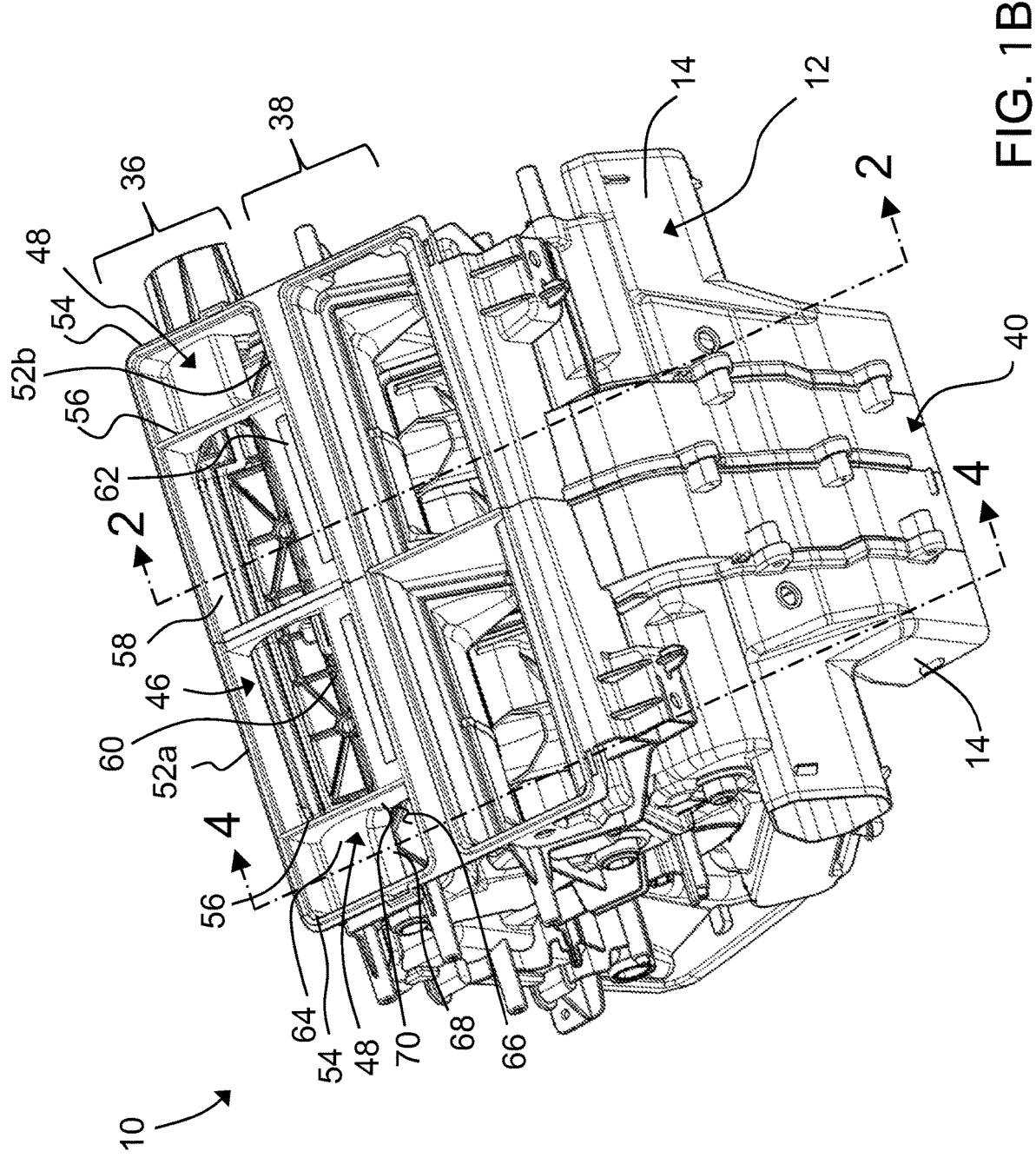
FIG. 1B is a top perspective view of an air handling system according to another embodiment of the disclosure

FIGS. 1A and 1B illustrate an air-handling system 10 of a heating, ventilating, and air conditioning (HVAC) system or climate control system for a vehicle (not shown) according to an embodiment of the disclosure. As used herein, the term air can refer to fluid in a gaseous state, fluid in a liquid state, or any combination thereof. The air-handling system 10 typically provides heating, ventilation, and air conditioning for a passenger compartment (not shown) of the vehicle.

The air-handling system 10 includes a hollow main housing 12. The housing 12 may be formed by the cooperation of a pair of housing shells 14. The housing shells 14 may interface with each other along peripheral regions thereof to form the hollow main housing 12. The main housing 12 may be formed from plastic, but other materials can be used, as desired. In other embodiments, the main housing 12 may be formed by the cooperation of three or more separately formed components or housing portions, as desired.

The main housing 12 includes an inlet section 16, a conditioning section 18, a mixing chamber 20, and a delivery section 22. The inlet section 16 receives a supply of air and may include a blower or fan (not shown) for causing the supply of the air to flow to the conditioning section 18. The supply of the air can be provided from outside of the vehicle, recirculated from the passenger compartment of the vehicle, or a mixture of the two, for example. If desired, a filter (not shown) can be provided upstream or downstream of the inlet section 16 to filter out debris or contaminants carried by the supply of air.

The conditioning section 18 may include an evaporator core 24, a heater core 26, and a temperature door 34 disposed therein. The evaporator core 24 and the heater core 26 are in communication with a source of cooled fluid (not shown) and a source of heated fluid (not shown) respectively. The evaporator core 24 may form a portion of a primary refrigerant circuit of the air conditioning system associated with the air-handling system 10. The evaporator core 24 is configured to exchange heat energy between the air flowing through the housing 12 and the cooled fluid flowing through the evaporator core 24 to cool and/or dehumidify the air. Although described as an evaporator core 24, it should be understood that any form of cooling device in heat exchange relationship with any device or system of the motor vehicle may be employed for use with the air-handling system 10 without departing from the scope of the present invention. The heater core 26 may form a radiator associated with a coolant circuit used to cool an engine of the motor vehicle. The heater core 26 is further configured to exchange heat energy between the air flowing through the housing 12 and a coolant circulated through the coolant circuit to heat the air. Alternatively, the heater core 26 may be in heat exchange relationship with a fluid used to cool a battery or other heat producing device associated with the motor vehicle or the heater core 26 may be a heating device configured to produce heat using an electrical source. It should be understood that any form of heating device suitable for heating a flow of air therethrough may be used in place the heater core 26 without departing from the scope of the present invention.

The evaporator core 24 may be disposed at an inlet region of the conditioning section 18 immediately downstream of the inlet section 16. As shown, the evaporator core 24 extends across an entirety of a flow area at the inlet region of the conditioning section 18 to cause the entirety of the air flowing to the conditioning section 18 to pass through the evaporator core 24, thereby cooling and/or dehumidifying the entirety of the air from the inlet section 16 when entering the conditioning section 18.

After flowing through the evaporator core 24, the flow of the air encounters a baffle wall 28. A cold air passageway 30 is formed to one side of the baffle wall 28 and a warm air passageway 32 is formed to a second side of the baffle wall 28. The warm air passageway 32 includes the heater core 26 disposed therein. The heater core 26 may be disposed across an entirety of a flow area of the warm air passageway 32, as desired. In other embodiments, only a portion of the flow area of the warm air passageway 32 is covered by the heater core 26, as desired.

Figure 2:
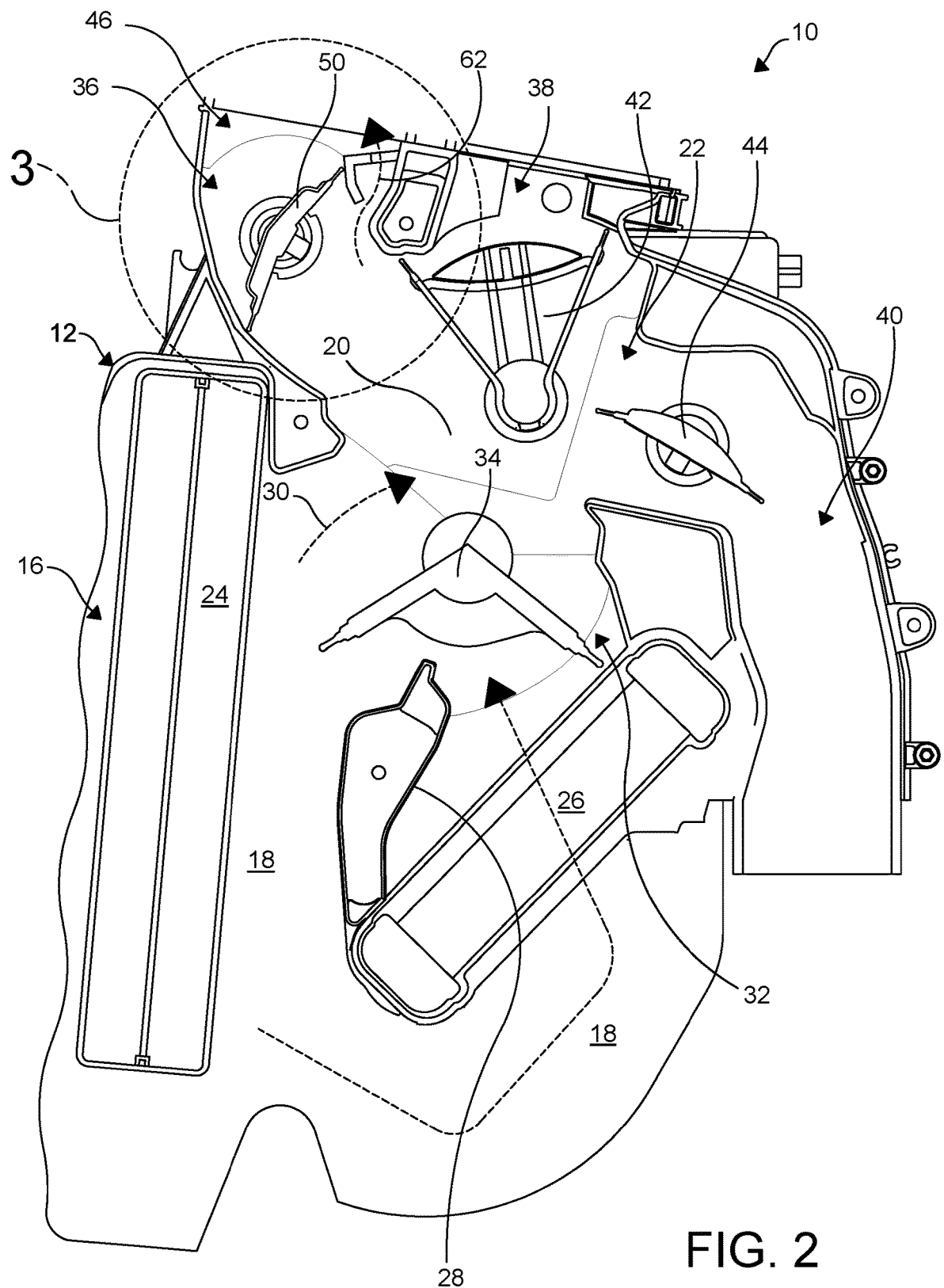
FIG. 2 is a cross-sectional right-side elevational view of the air handling system of FIG. 1, taken along section line 2-2 as shown in FIG. 1B.
Figure 4:
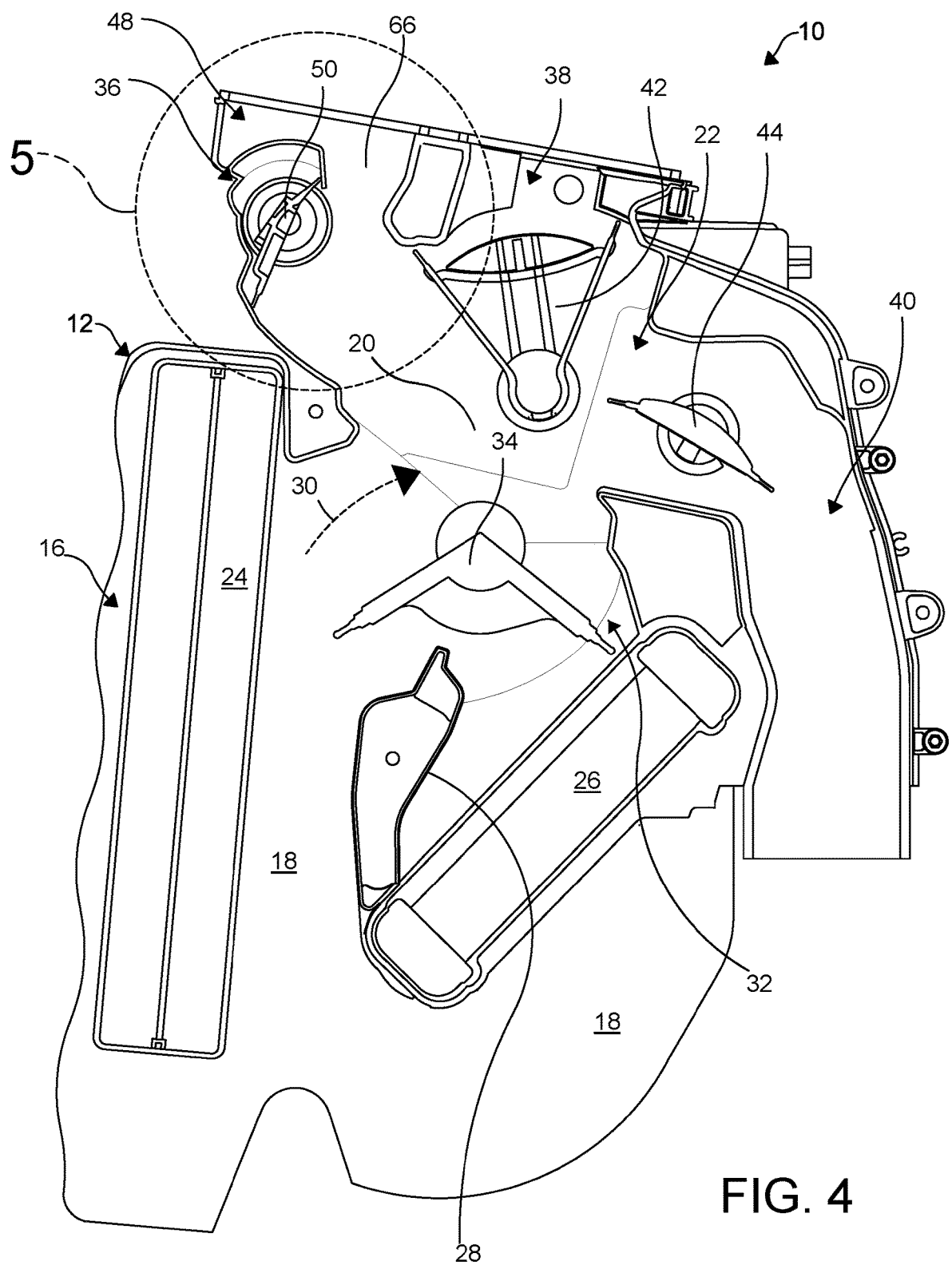
FIG. 4 is a cross-sectional right-side elevational view of the air handling system of FIG. 1B, taken along section line 4-4 as shown in FIG. 1B.

The temperature door 34 is rotatably coupled to the main housing 12 at a downstream end of each of the cold air passageway 30 and the warm air passageway 32. The temperature door 34 may be positioned in a first position (not shown) wherein the temperature door 34 is rotated to block flow of the air flowing through the warm air passageway 32. When the temperature door 34 is in the first position the entirety of the air flowing from the inlet section 16 is directed through the opened cold air passageway 30 immediately after flowing through the evaporator core 24. The temperature door 34 may alternatively be positioned in a second position (not shown) wherein the temperature door 34 is rotated to block flow of the air flowing through the cold air passageway 30. When the temperature door 34 is in the second position, the entirety of the air is directed through the warm air passageway 32 immediately after flowing through the heater core 26. The temperature door 34 may alternatively be rotated to an intermediate position between the first position and the second position, as shown in FIGS. 2 and 4. When in the intermediate position, a first partial air flow of the air flowing from the inlet section 16 may flow through the cold air passageway 30, past the temperature door 34, while a second partial air flow of the air flowing from the inlet section 16 may flow through the warm air passageway 32 including passing through the heater core 26, past the temperature door 34. The first partial air flow and the second partial air flow of the air flowing through the conditioning section 18 from the inlet section 16 are then recombined in the mixing chamber 20. As should be understood, the temperature door 34 may be adjustable to a variety of intermediate positions to control a percentage of the air flowing through the cold air passageway 30 and the warm air passageway 32, respectively, to control a temperature of the air according to desired temperature settings of a passenger within the passenger compartment of the motor vehicle.

The delivery section 22 of the main housing 12 includes a plurality of conduits 36, 38, 40. In the illustrated embodiment, the delivery section 22 includes a defrost conduit 36, a panel conduit 38, and a floor conduit 40.

A first mode door 42 is rotatably coupled to the main housing 12 within the delivery section 22, adjacent the mixing chamber 20. The first mode door 42 may be positioned in a first position wherein the first mode door 42 is rotated to block flow of the air flowing into the panel conduit 38, as shown. When in the first position, the air flowing in the delivery section 22 from the conditioning section 18 is distributed between one or both of the defrost conduit 36 and the floor conduit 40. The first mode door 42 rotated to the first position may correspond to one of a floor operating mode, a defrost operating mode, and a mixed floor/defrost operating mode. The first mode door 42 may alternatively be positioned in a second position (not shown) wherein the first mode door 42 is rotated to block flow of the air flowing into the defrost conduit 36. When in the second position, the air flowing through the delivery section 22 from the mixing chamber 20 is distributed between one or both of the panel conduit 38 and the floor conduit 40. The first mode door 42 rotated to the second position may correspond to a panel operating mode or a mixed panel/floor operating mode. As should be understood, the first mode door 42 may be adjustable to a variety of intermediate positions to control a percentage of the air flowing through the defrost conduit 36, the panel conduit 38, and the floor conduit 40, respectively, as desired.

A second mode door 44 is rotatably coupled to the main housing 12 within the floor conduit 40 of the delivery section 22. The second mode door 44 may be positioned in a first position (not shown) wherein the second mode door 44 is rotated to block flow of the air flowing through the floor conduit 40 from the mixing chamber 20. The second mode door 44 rotated to the first position may correspond to one of the defrost operating mode or the panel operating mode, for example. The second mode door 44 may alternatively be positioned in a second position, wherein the second mode door 44 is rotated to allow and direct the air flowing from the mixing chamber 20 to flow into the floor conduit 40, as shown. The second mode door 44 rotated to the second position may correspond to one of the floor operating mode, the mixed panel/floor operating mode, and the mixed floor/defrost operating mode. As should be understood, the second mode door 44 may be adjustable to a variety of intermediate positions to control a velocity, pressure, or percentage of the air flowing through the floor conduit 40, as desired.

As shown in FIGS. 2 and 4, the defrost conduit 36 fluidly couples the mixing chamber 20 to one or more defrost vents (not shown) directed towards various windows of the vehicle. The defrost conduit 36 is segregated into a plurality of sub-conduits, including one or more windshield conduits 46 and one or more side window conduits 48. A diverter 50 is rotatably coupled to the main housing 12 within the defrost conduit 36, and is configured to selectively control a flow of air through the windshield conduits 46 and the side window conduits 48, as described below.

The defrost conduit 36 is generally defined by an opposing pair of longitudinally disposed sidewalls 52a, 52b and an opposing pair of laterally disposed end walls 54 spanning a distance between the sidewalls 52a, 52b. Each of a pair of laterally disposed dividers 56 also spans the distance between the sidewalls 52a, 52b, and is spaced inwardly from the end walls 54, thereby segregating the one or more windshield conduits 46 from the one or more side window conduits 48.

As shown in FIGS. 1A and 1B, the windshield conduit 46 is defined by the sidewalls 52a, 52b and the dividers 56, and includes a primary portion 58. The primary portion 58 of the windshield conduit 46 is configured to provide a maximized flow of the air to a windshield of the vehicle when the diverter 50 of the defrost conduit 36 is in an open position (not shown). The primary portion 58 of the windshield conduit 46 is defined by a first sidewall 52a of the defrost conduit 36, the dividers 56, and an inner wall 60.

Figure 3A:
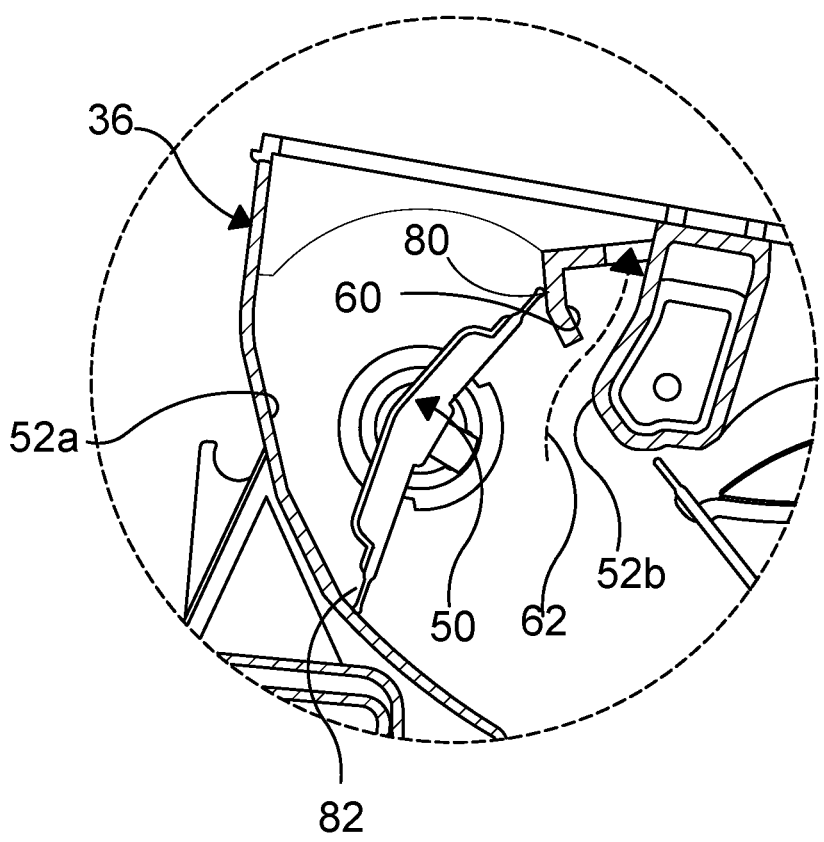
FIG. 3A is an enlarged fragmentary cross-sectional right-side elevational view of the air handling system of FIG. 1B, taken at area 3 of FIG. 2, wherein a diverter of the air-handling system is in a bleed position.

In an alternate embodiment of the air-handling system 10, shown in FIG. 1B, the windshield conduit 46 may further include a bleed path 62 formed adjacent the primary portion 58. The bleed path 62 is formed intermediate the inner wall 60 and one of the sidewalls 52a, 52b of the windshield conduit 46, and is configured to provide a minimized continuous flow of air through the windshield conduit 46 when the housing 12 is configured in the floor operating mode, as shown in FIGS. 2 and 3A. The bleed path 62 is defined as a path having a cross-sectional flow area less than a cross-sectional flow area of the first portion of the defrost conduit 36, wherein a relatively small percentage of the air flowing from the mixing chamber 20 is caused to "bleed" through the bleed path 62.

Each of a pair of the side window conduits 48 is disposed on opposing ends of the windshield conduit 46, wherein each of the side window conduits 48 is segregated from the windshield conduit 46 by one of the dividers 56. As shown in FIGS. 1A and 1B, each of the side window conduits 48 is a mirror image of the other. Accordingly, only the features of a first one of the side window conduits 48 will be described. The side window conduit 48 includes a baffle 64 extending inwardly from the first sidewall 52a of the conduit and traversing a distance between the end wall 54 and the respective one of the dividers 56. As shown, the baffle 64 is arcuate, wherein a radius of the baffle 64 is concentric with and corresponds to an outer radius of the diverter 50, as described below. However, in alternate embodiments the baffle 64 may be other shapes, such as planar or polygonal, and may be offset from an outer radius of the diverter 50. A distal end of the baffle 64 is disposed intermediate the first sidewall 52a and a second sidewall 52b of the defrost conduit 36, wherein a passage 66 is formed intermediate the second sidewall 52b and the distal end of the baffle 64.

Figure 5B:
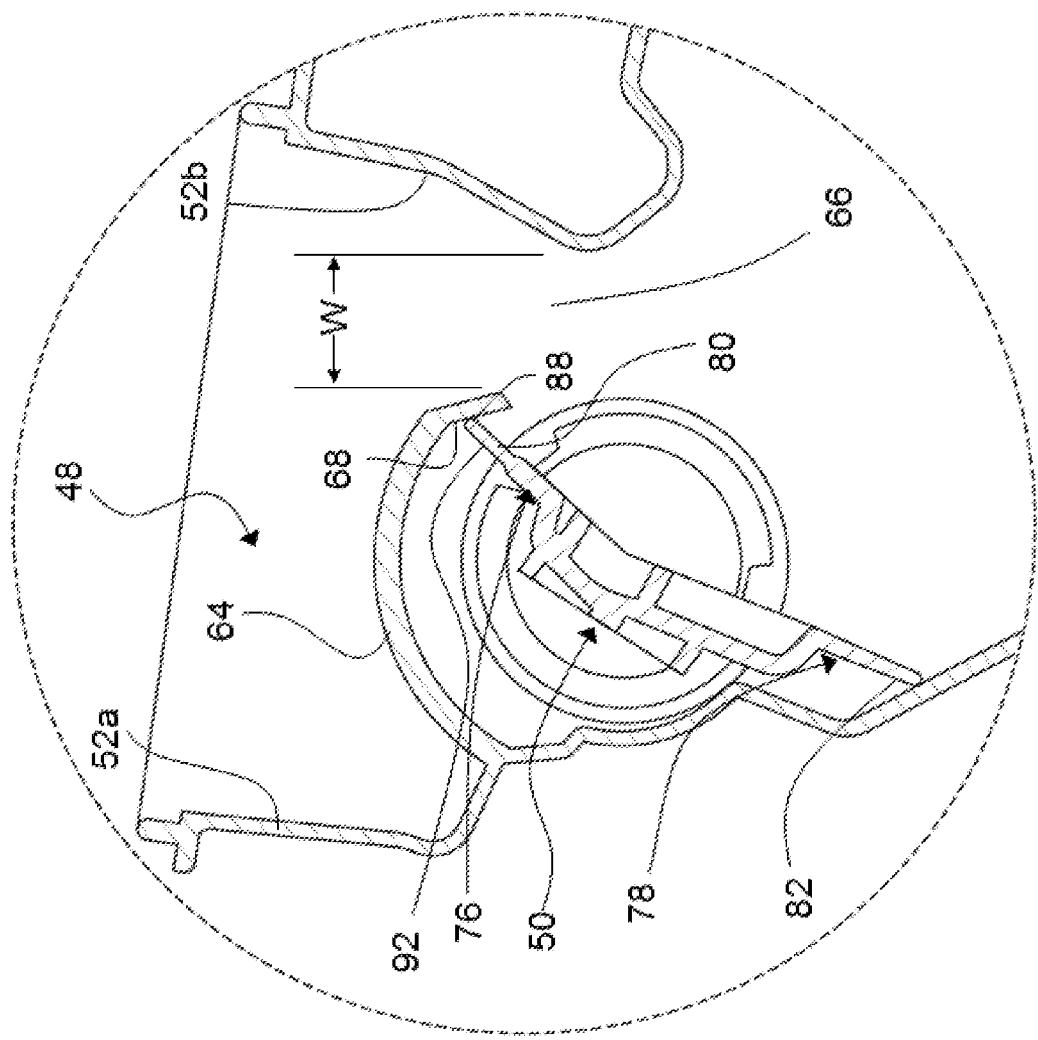
FIG. 5B is an enlarged fragmentary cross-sectional right-side elevational view of another embodiment of the air handling system of FIG. 1B, taken at area 5 of FIG. 4.
Figure 6:
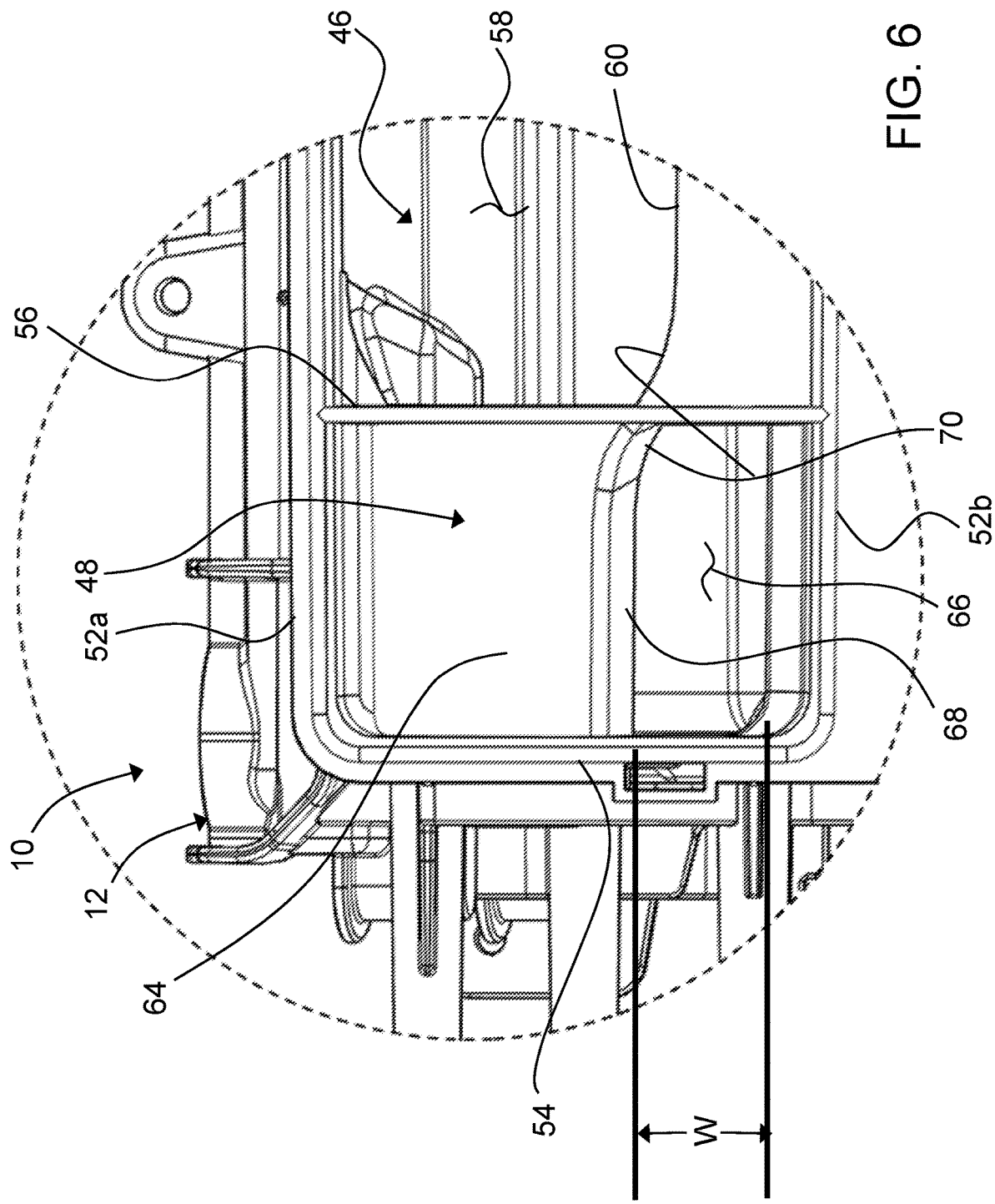
FIG. 6 is an enlarged fragmentary top plan view of the air handling system of FIG. 1A, taken at area 6 of FIG. 1A.
Figure 7:
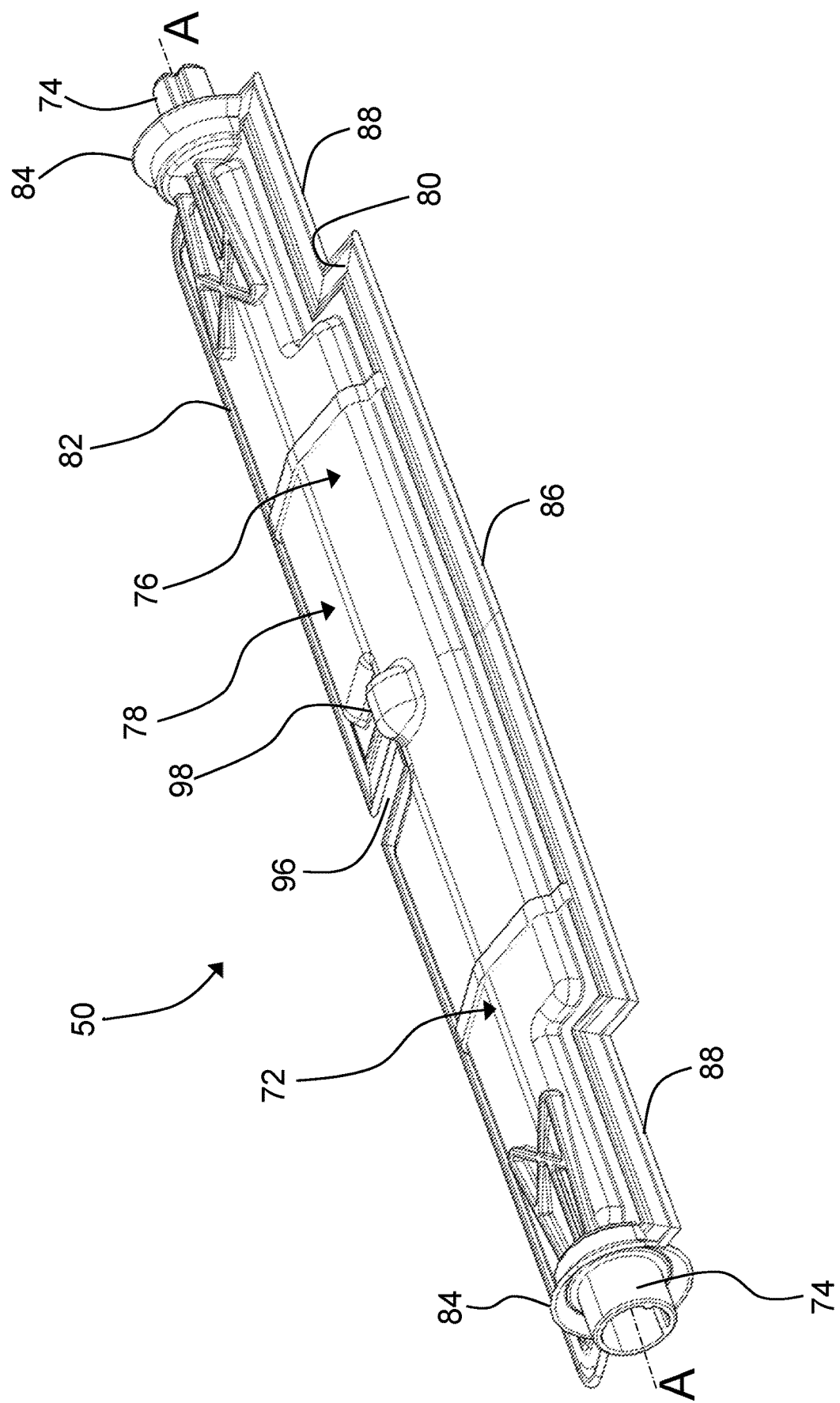
FIG. 7 is a top perspective view of an embodiment of a diverter for the air handling system of FIG. 1B according to the instant disclosure.
Figure 8:
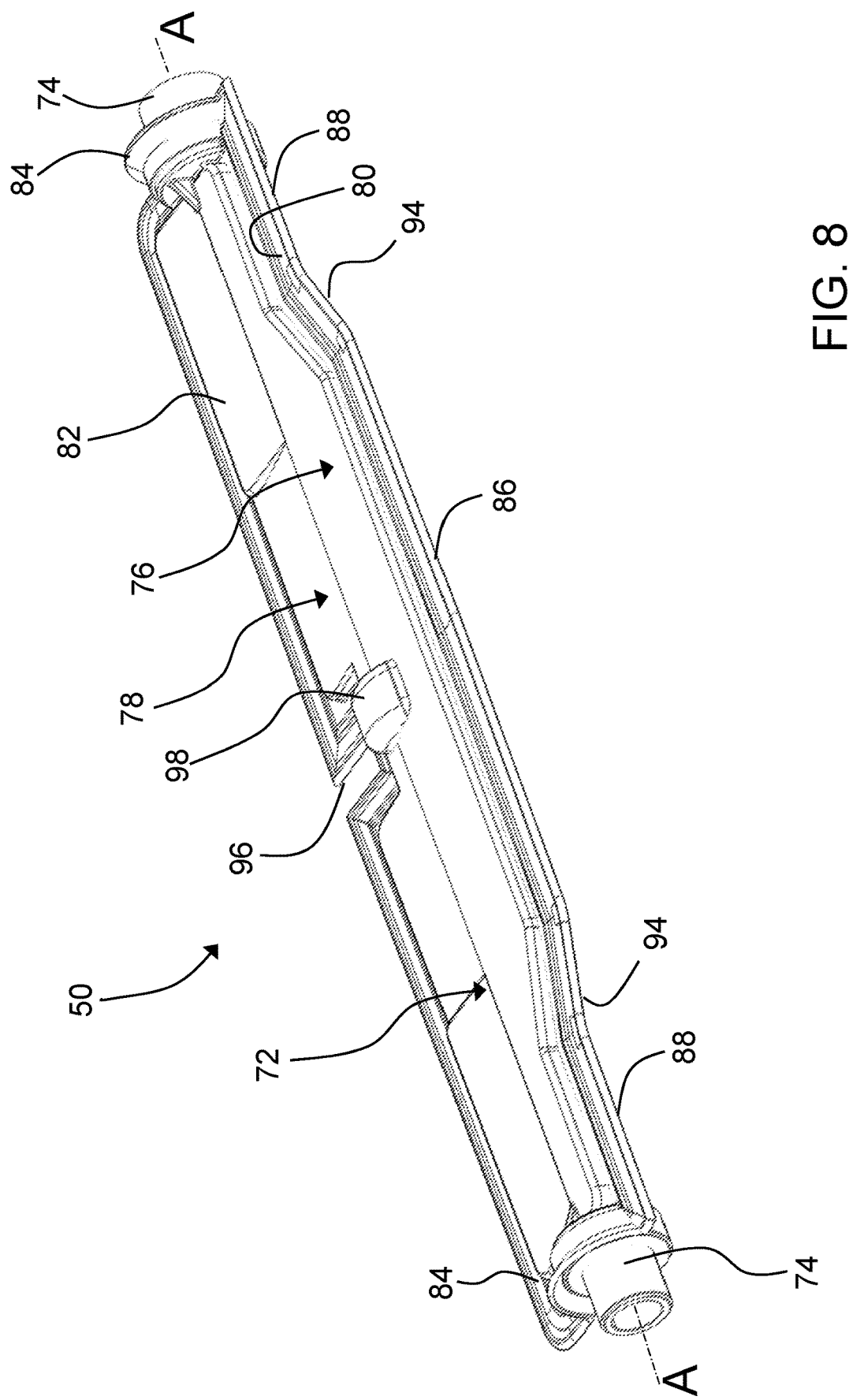
FIG. 8 is a top perspective view of another embodiment of a diverter for the air handling system of FIG. 1B according to the instant disclosure.

A lip 68 extends into the housing 12 from the distal end of the baffle 64, and spans the distance between the end wall 54 and the divider 56, wherein a width W of an effective opening of the passage 66 is defined by a minimum distance between the lip 68 and the second sidewall 52b, as shown in FIGS. 5A-6. As shown, the lip 68 may be offset from the inner wall 60 with respect to the lateral direction of the defrost conduit 36. In one embodiment, the lip 68 and the inner wall 60 may each include opposing radii formed on opposing sides of the divider 56, wherein a continuous serpentine-shaped transition area 70 from the inner wall 60 to the lip 68 is formed across the divider 56. By forming the lip 68 and the inner wall 60 with the continuously radiused transition area 70, sharp corners and resulting leak paths in the housing 12 are minimized, thereby maximizing efficiency of the system 10.

Referring now to FIGS. 7-13, the diverter 50 of the instant disclosure includes a main body 72 having a pair of cylindrical trunnions 74 disposed on opposing ends thereof, wherein the trunnions 74 are configured to rotatably couple the diverter 50 to the housing 12. As shown, the trunnions 74 are cylindrical bodies and are aligned along a common rotational axis A of the diverter 50.

In the illustrated embodiment, the main body 72 of the diverter 50 includes a first member 76 and a second member 78 each extending radially outwardly from the axis of rotation (A). The first member 76 and the second member 78 are each substantially planar, and are disposed at an oblique angle to each other with respect to the axis of rotation (A), wherein the first member 76 and the second member 78 form two distinct planes of the main body 72. In alternate embodiments, the first member 76 and the second member 78 may be coplanar, parallel to each other, and/or offset from the axis of rotation (A).

A first sealing member 80 circumscribes an outer perimeter of the first member 76 and a second sealing member 82 circumscribes an outer perimeter of the second member 78. As shown, each of the first sealing member 80 and the second sealing member 82 include substantially planar flanges extending outwardly from the first member 76 and the second member 78, respectively. In one embodiment, the sealing members are formed separately from the main body 72. For example, the sealing members may be formed of a resilient material configured to seal against the walls of the defrost conduit 36, and coupled to the main body 72 using adhesive or mechanical means. In the illustrated embodiment, the sealing members 80, 82 are monolithically formed with a pair of ring seals 84 configured to seal around a circumference of each of the trunnions 74. In another embodiment, each of the sealing surfaces may be integrally formed with the planar portions of the diverter 50, wherein the sealing surfaces are formed of the same material as the planar portions.

As shown in FIGS. 7-13, the first sealing member 80 includes an outer edge 86 and at least one offset edge 88 disposed radially inwardly from the outer edge 86. The offset edge 88 is configured to sealingly contact an inner surface of the lip 68, wherein a radial distance from the axis of rotation (A) to the offset edge 88 is greater than a radial distance from the axis of rotation (A) to the inner surface of the lip 68, but less than a radial distance from the axis of rotation (A) to an inner surface of the baffle 64. In the illustrated embodiment, the outer edge 86 and the offset edge 88 are parallel to each other and the axis of rotation (A). In alternate embodiments, the outer edge 86 and the offset edge 88 may be formed at an oblique angle with respect to each other and/or the axis of rotation (A).

Figure 11:
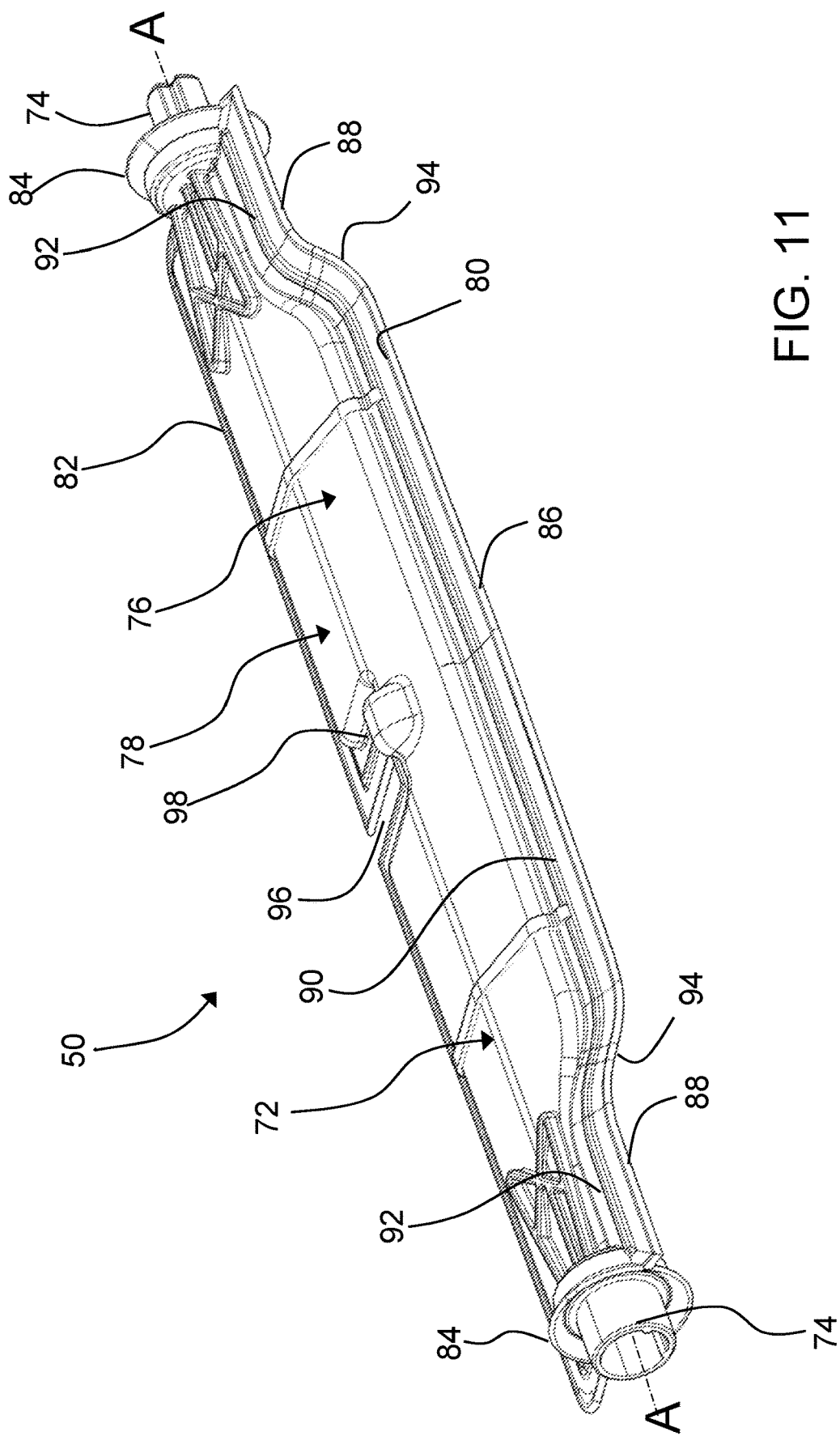
FIG. 11 is a top perspective view of another embodiment of a diverter for the air handling system of FIG. 1B according to the instant disclosure.

In addition to being offset radially inwardly from the outer edge 86, the first member 76 may include a first planar portion 90 including the outer edge 86 and a second planar portion 92 including the offset edge 88, wherein the second planar portion 92 is spaced from the first planar portion 90, as shown in FIGS. 11-13. In the illustrated embodiment the second planar portion 92 is substantially parallel to and spaced from the first planar portion 90. However, in alternate embodiments, the second planar portion 92 may be formed at an oblique angle to the first planar portion 90.

As shown in FIGS. 8-13, the main body 72 may also include a transition area 94 formed intermediate the outer edge 86 and the offset edge 88, wherein the transition area 94 is continuously formed with the outer edge 86 and the offset edge 88, and corresponds to a profile of the transition area 70 of the defrost conduit 36. Particularly, when the offset edge 88 is spaced radially inward and formed on the second planar portion 92, the transition area 94 of the main body 72 may be a compound transition area 94, wherein a first set of radii are formed between the outer edge 86 and the offset edge 88 in the radial direction, and a second set of radii are formed between the first planar portion 90 and the second planar portion 92, as shown in FIGS. 11-13.

In the illustrated embodiments, the first sealing member 80 includes one of the offset edges 88 formed at each end of the main body 72 to accommodate each of the side window conduits 48. However, in alternate embodiments, the first sealing member 80 may include a single offset edge 88 to accommodate a single side window conduit 48. Further, the first sealing member 80 may include one or more offset edges 88 formed intermediate to the ends of the main body 72 to accommodate one or more side window conduits 48 formed intermediate to the ends of the defrost conduit 36.

The main body 72 may further include one or more features configured to accommodate a corresponding feature of the housing 12 as the diverter 50 is rotated within the housing 12. For example, the main body 72 may include at least one relief 96 configured to receive a rib of the housing 12 therein. Additionally, the main body 72 may include a protuberance 98 configured to be received in a channel (not shown) in the housing 12, wherein the engagement of the protuberance 98 with the channel maintains an axial alignment of the diverter 50 with respect to the axis of rotation (A), and obstructs a flow of air around the diverter 50.

In use, the diverter 50 may be positioned in a bleed position, as shown in FIGS. 2, 3A, and 4-5B. In the bleed position, the diverter 50 is configured to block a flow of the air through a first portion of the windshield conduit 46, while allowing a flow of the air flowing through the side window conduit 48 and the bleed path 62. In the bleed position, the outer edge 86 of the first sealing member 80 of the diverter 50 engages the inner wall 60 and the second sealing member 82 engages the first sidewall 52a of the defrost conduit 36, wherein the primary portion 58 of the defrost conduit 36 is sealingly closed, while the bleed portion and the side window conduit 48 are opened, as shown in FIG. 3A. As shown in FIGS. 5A and 5B, in the bleed position the offset edge 88 of the first sealing member 80 sealingly contacts the lip 68 and sealing member 82 sealingly contacts the first sidewall 52a to seal the passage 66, thereby preventing a bypass of air from the side window conduit 48 into the windshield conduit 46. Thus, the side window conduit 48 is open to provide the flow of the air to the side window vents when the diverter 50 is in the bleed position. The diverter 50 rotated to the bleed position may correspond to the floor operating mode.

Figure 3B:
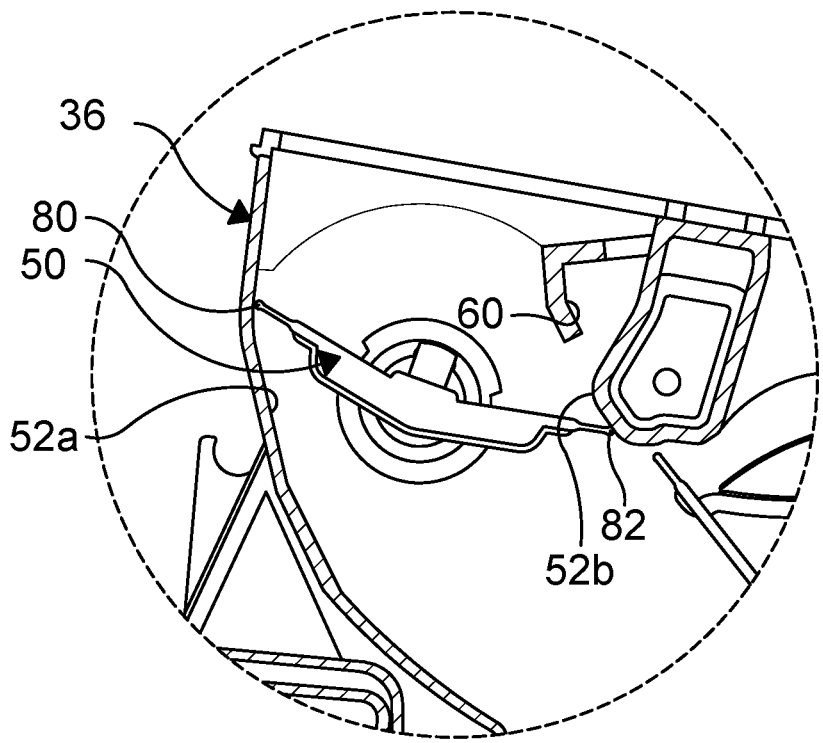
FIG. 3B is an enlarged fragmentary cross-sectional right-side elevational view of the air handling system of FIG. 1B, taken at area 3 of FIG. 2, wherein a diverter of the air-handling system is in a closed position.

The diverter 50 may also be rotated to a closed position, as shown in FIG. 3B, wherein the diverter 50 is rotated to block flow of the air flowing through the defrost conduit 36 from the mixing chamber 20. In the closed position, the first sealing member 80 of the diverter 50 engages the first sidewall 52a of the defrost conduit 36 and the second sealing member 82 of the diverter 50 engages the second sidewall 52b of the defrost conduit 36. It will be understood that the profile of the first sidewall 52a corresponds to a profile of the first sealing member 80, wherein each of the outer edge 86, the offset edge 88, and the transition sealingly contact the first sidewall 52a when the diverter 50 is in the closed position.

It is understood, the diverter 50 may be positioned in an intermediate position (not shown) between the closed position and the bleed position to allow the air to flow through both the first portion of the defrost conduit 36 and the bleed path 62. The intermediate position may correspond with the defrost operating mode and the mixed floor/defrost operating mode.

For illustrative purposes only, the disclosure of the application describes the air-handling system 10 configured in the floor operating mode shown in FIGS. 2, 3A, and 4-5B, wherein the first mode door 42 is positioned in the first position to block the flow of the air flowing into the panel conduit 38, the second mode door 44 is positioned in the second position to allow and direct the air to flow into the floor conduit 40, and the diverter 50 is positioned in the bleed position to block the flow of the air flowing through the first portion of the defrost conduit 36 and allow or direct the air to flow through the bleed path 62 of the defrost conduit 36. However, it is understood, the air-handling system 10 can have alternate configurations, sections, conduits, doors, door positions, and other features to control distribution, volumetric flow, and pressure of the air flowing through the housing 12. Additionally, the alternate configurations can correspond to alternate operating modes as desired depending on the application for the air-handling system 10.

It will also be appreciated by those of ordinary skill in the art that although the instant disclosure illustrates a method and apparatus of controlling variable flows through the windshield conduit 46 and the side window conduit 48, the principals of the disclosure could be applied to any conduit of an HVAC housing where it is desirable to variably control distinct passageways using a single mechanism. For example, in alternate embodiments (not shown), the panel conduit 38 and/or the floor conduit 40 may be divided into a first passageway supplying air to a first vent in a first area of the passenger compartment and a second passageway supplying air to a second vent in a second area of the passenger compartment, wherein it is desirable to provide a continuous and relatively constant flow of air to the first vent, while broadly controlling the flow of air to the second vent based on the teachings of the instant disclosure. Accordingly, the configuration of the diverter 50 and the defrost conduit 36 could be similarly incorporated into one or both of the panel conduit 38 and the floor conduit 40.

By forming the first sealing member 80 to include the radially inwardly offset edge 88, the lip 68 of the baffle 64 can be moved radially inwardly with respect to the axis of rotation (A) compared to designs of the prior art including substantially straight sealing surfaces. Consequently, the lip 68 is moved away from the second sidewall 52*b* of the defrost conduit 36, and the width of the effective opening can be increased compared to the effective opening of the prior art. By forming the offset edge 88 radially inwardly and on a second planar portion 92 spaced from the first planar portion 90, the lip 68 can be moved upward along the arc of the baffle 64, and the width of the effective opening of the passage 66 can be further increased over the design including only the radially inwardly offset edge 88, as shown in FIGS. 5A and 5B.

Accordingly, from the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A climate control system comprising:
    a housing having a defrost conduit formed therein, the defrost conduit fluidly coupled to each of a side window defrost vent and a windshield defrost vent, the defrost conduit including a first subconduit formed in an intermediate portion of the defrost conduit and a second subconduit adjacent an end of the first subconduit, wherein the first subconduit fluidly couples the defrost conduit to the windshield defrost vent and the second subconduit fluidly couples the defrost conduit to the side window defrost vent, wherein the first subconduit is partially defined by a first inner wall and an oppositely arranged second inner wall, and wherein the second subconduit is partially defined by a lip and the second inner wall, wherein a first portion of the lip is disposed between the first inner wall and the second inner wall, wherein an arcuate baffle extends from the first portion of the lip to the first inner wall; and
    a diverter rotatably disposed within the defrost conduit, the diverter including a member having an outer edge and an offset edge, the outer edge configured to sealingly contact the second inner wall of the first subconduit and the offset edge configured to sealingly contact the lip of the second subconduit when the diverter is in a first position.

2. The climate control system of claim 1, wherein the offset edge is disposed radially inwardly from the outer edge with respect to an axis of rotation of the diverter.

3. The climate control system of claim 1, wherein the outer edge is formed on a first planar portion of the member and the offset edge is formed on a second planar portion of the member.

4. The climate control system of claim 1, wherein the second inner wall and a second portion of the lip are continuously formed to form a transition area of the defrost conduit.

5. The climate control system of claim 4, wherein the outer edge of the member of the diverter and the offset edge of the member of the diverter are continuously formed to form a transition area of the diverter.

6. The climate control system of claim 5, wherein a profile of the transition area of the defrost conduit corresponds to a profile of the transition area of the diverter.

7. The climate control system of claim 1, wherein the first subconduit includes a bleed path partially defined by the second inner wall.

8. The climate control system of claim 1, wherein a plane arranged perpendicular to a direction of flow of air through the second subconduit passes through each of the first inner wall, the first portion of the lip, and the second inner wall.

* * * * *